US007092391B2

(12) United States Patent
Umeda

(10) Patent No.: US 7,092,391 B2
(45) Date of Patent: Aug. 15, 2006

(54) MULTI-HOP PEER-TO-PEER TELECOMMUNICATIONS METHOD IN A WIRELESS NETWORK, RADIO TERMINAL TELECOMMUNICATIONS METHOD, AND MEDIUM RECORDING A PROGRAM FOR CAUSING A PROCESSOR TO IMPLEMENT THE RADIO TERMINAL TELECOMMUNICATIONS METHOD

(75) Inventor: Hidekazu Umeda, Shinagawa-ku (JP)

(73) Assignee: Skyley Networks, Inc., Tokyo (JP)

( * ) Notice: Subject to any disclaimer, the term of this patent is extended or adjusted under 35 U.S.C. 154(b) by 889 days.

(21) Appl. No.: 10/082,223

(22) Filed: Feb. 26, 2002

(65) Prior Publication Data

US 2003/0161330 A1 Aug. 28, 2003

(51) Int. Cl.
*H04L 12/56* (2006.01)
(52) U.S. Cl. .................. 370/392; 455/41.2; 455/518
(58) Field of Classification Search ................ 370/400, 370/255, 389, 392, 393; 455/518, 519, 41.2, 455/445
See application file for complete search history.

(56) References Cited

U.S. PATENT DOCUMENTS 5,987,011 A * 11/1999 Toh .............................. 370/331
6,028,857 A *  2/2000 Poor ........................... 370/351

(Continued)

OTHER PUBLICATIONS

Gerla et al., "Fisheye State Routing Protocol (FSR) for Ad Hoc Networks", http://www.ietf.org/internet-drafts/draft-ietf-manet-fsr-00.txt, 2001.

(Continued)

*Primary Examiner*—Min Jung
(74) *Attorney, Agent, or Firm*—Oliff & Berridge, PLC

(57) ABSTRACT

The present invention is a method for performing multi-hop peer-to-peer telecommunications on a wireless network, the topology of which changes moment by moment and which includes a plurality of radio terminals. The present invention makes possible correct routing control even on a network with severe topology changes.

The present invention comprises the following steps:

each radio terminal exchanges the link state with radio terminals capable of direct communication (this link state includes only information on radio terminals within a predetermined number of hops), and constructs a routing table;

a packet is prepared including the routing stack for storing intermediate routing information whenever the packet passes through the terminals;

the sender terminal designates a destination terminal and broadcasts the abovementioned packet;

the radio terminals on the route, which receive the packet, write the intermediate routing information to the routing stack while transferring the packet to all radio terminals based on the routing table;

the destination terminal which receives said packet returns said packet to said sender terminal through the route followed by said packet based on information in said routing stack; and said sender terminal which receives said packet unicasts a message to said destination terminal through the radio terminals on said route based on information in said routing stack included in said packet.

14 Claims, 8 Drawing Sheets

EXAMPLE OF NETWORK TOPOLOGY

U.S. PATENT DOCUMENTS

| | | | |
|---|---|---|---|
| 6,385,174 B1* | 5/2002 | Li | 370/252 |
| 6,704,293 B1* | 3/2004 | Larsson et al. | 370/255 |
| 2002/0039357 A1* | 4/2002 | Lipasti et al. | 370/338 |
| 2002/0044549 A1* | 4/2002 | Johansson et al. | 370/386 |
| 2003/0026268 A1* | 2/2003 | Navas | 370/400 |
| 2003/0033394 A1* | 2/2003 | Stine | 709/222 |
| 2003/0037167 A1* | 2/2003 | Garcia-Luna-Aceves et al. | 709/238 |
| 2003/0179742 A1* | 9/2003 | Ogier et al. | 370/351 |

OTHER PUBLICATIONS

Perkins et al., "Ad hoc On-Demand Distance Vector (AODV) Routing", http://www.ietf.org/internet-drafts/draft-ietf-manet-aodv-08.txt, 2001.

Johnson et al, "The Dynamic Source Routing Protocol for Mobile Ad Hoc Networks (DSR)", http://www.ietf.org/internet-drafts/draft-ietf-manet-dsr-07.txt, 2002.

* cited by examiner

EXAMPLE OF NETWORK TOPOLOGY

LINK STATE

| DESTINATION ID | |
|---|---|
| NUMBER OF NEIGHBORS | SPQUENCE NUMBER |
| NEIGHBOR ID1 | |
| NEIGHBOR ID2 | |
| ⋮ | |

TOPOLOGY FROM A VIEW B

TOPOLOGY FROM A VIEW A

BROADCASTING FROM A

| ... | ... |
|---|---|
| ... | 4 |
| ⋮ | |
| ID(F) ||
| ID(A) ||
| ⋮ | |
| 12 | 34 | 197 |
| 105 | 0 | 0 |

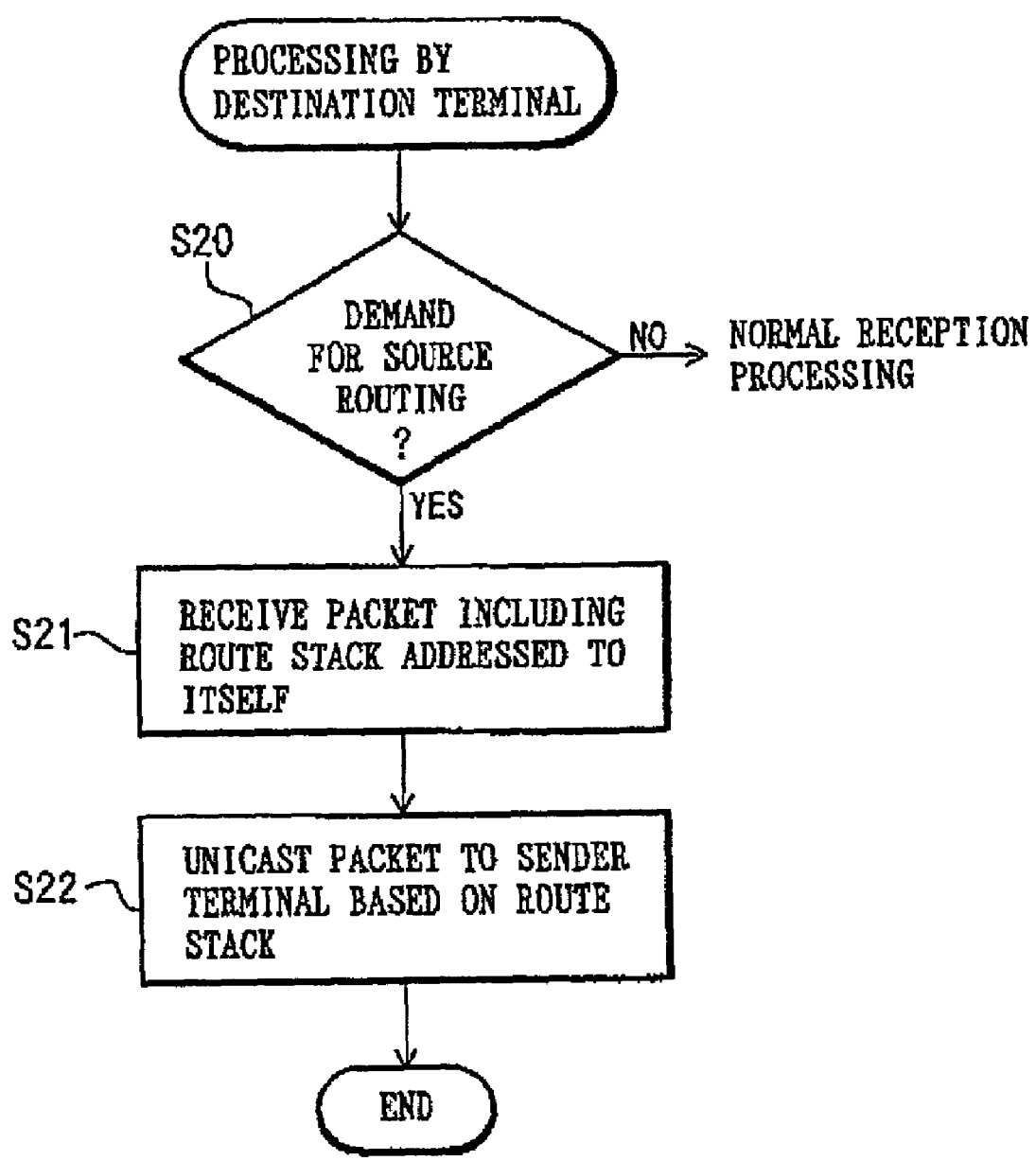

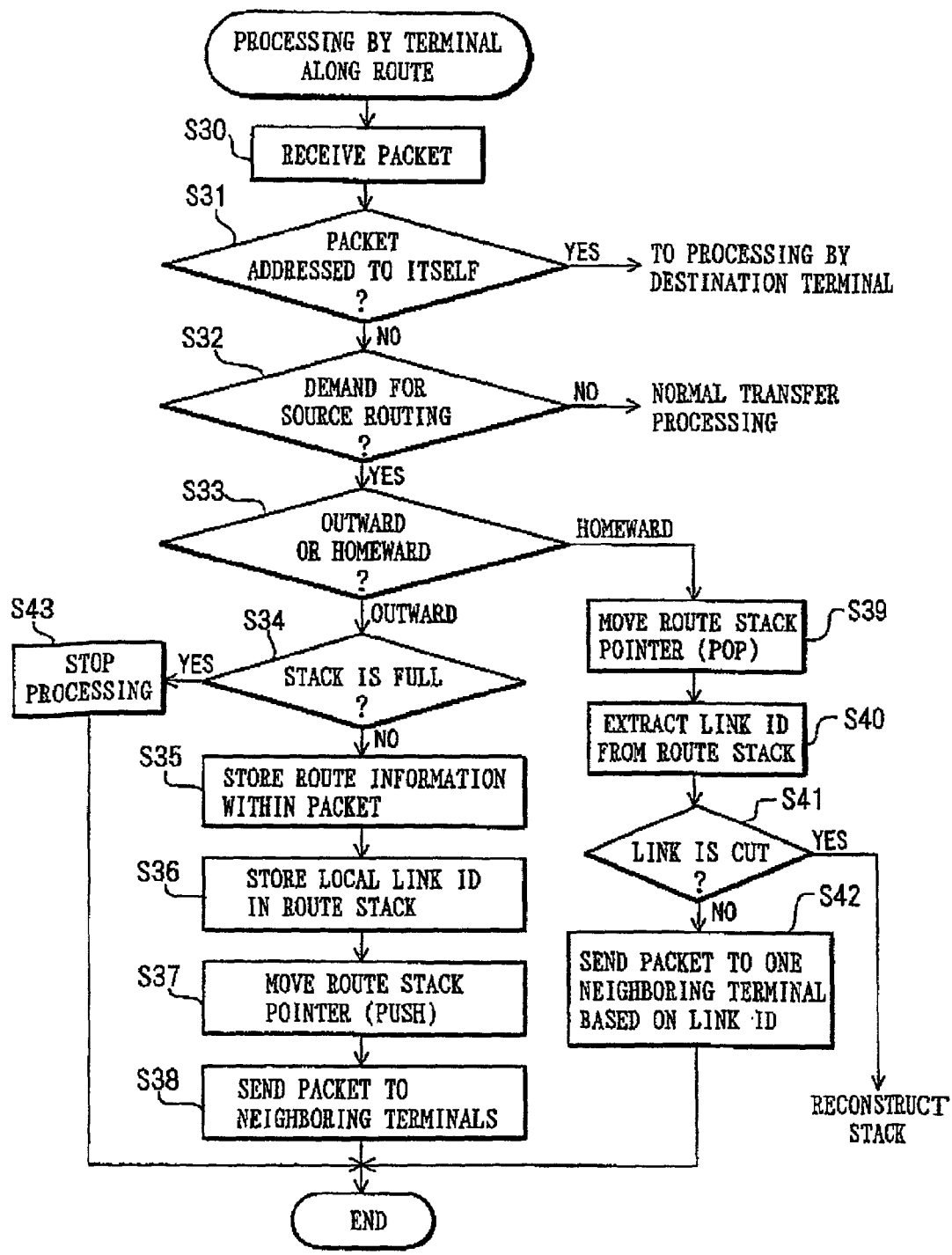

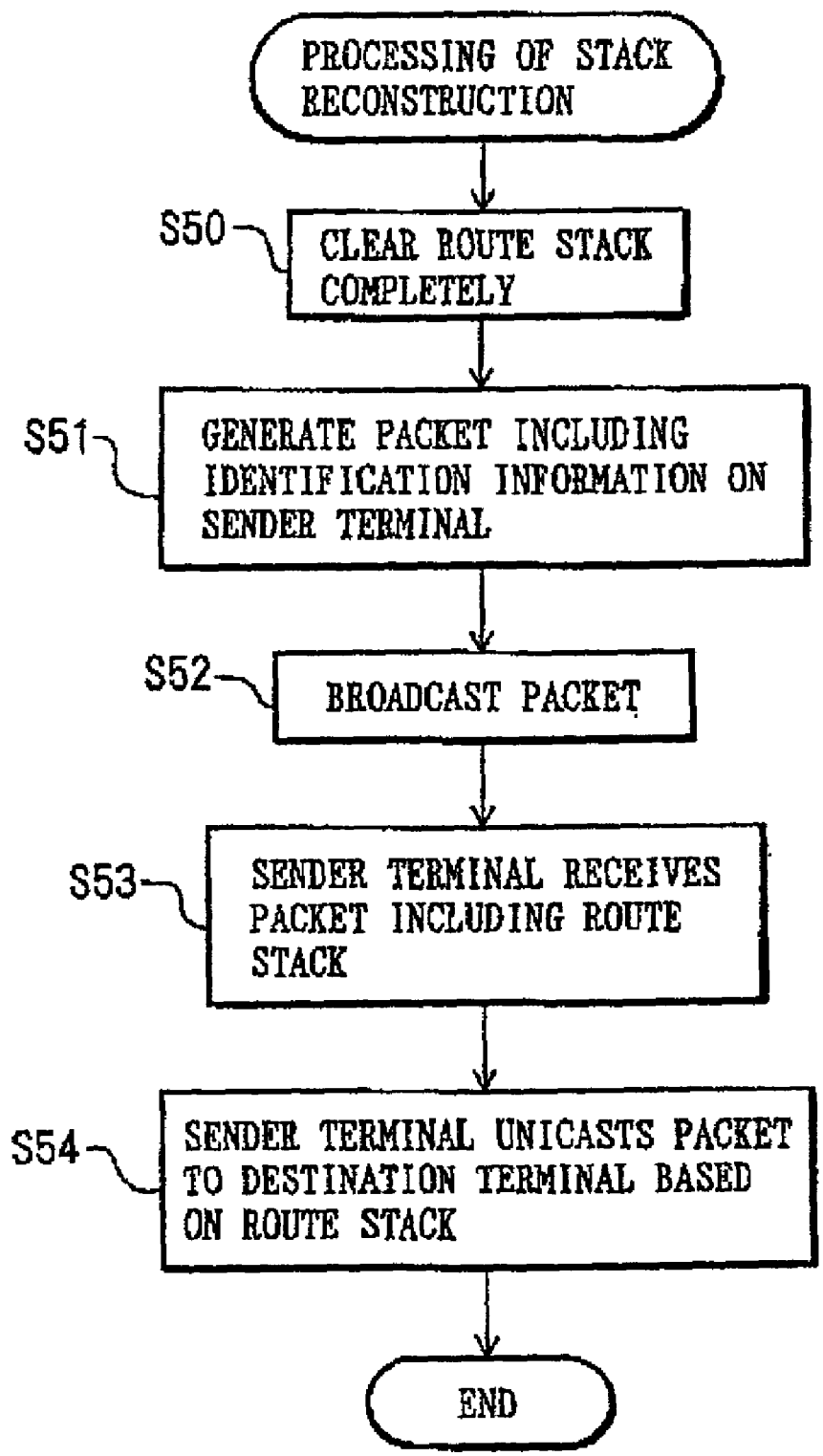

MULTI-HOP PEER-TO-PEER TELECOMMUNICATIONS METHOD IN A WIRELESS NETWORK, RADIO TERMINAL TELECOMMUNICATIONS METHOD, AND MEDIUM RECORDING A PROGRAM FOR CAUSING A PROCESSOR TO IMPLEMENT THE RADIO TERMINAL TELECOMMUNICATIONS METHOD

BACKGROUND OF THE INVENTION

1. Field of the Invention

The present invention relates to a protocol for performing multi-hop peer-to-peer telecommunications in a wireless network, and a radio terminal telecommunications method.

2. Description of the Related Art

The Internet Protocol (IP) is known as a data telecommunications protocol using a network. This protocol is widely used on the Internet.

Recently, wireless networks using protocols such as IEEE802.11x and Bluetooth have been coming into widespread use, along with the provision of data telecommunications using wireless networks. Systems for this purpose are equipped with a central server or central point and do not have the purpose of carrying out peer-to-peer telecommunications.

In order to perform multi-hop peer-to-peer telecommunications on a wireless network, each terminal on the route must correctly perform routing control of the packets. However, in the conventional routing control technology on the Internet, it is thought to be highly probable that the routing information updates cannot stay current on networks with severe topology changes. On a wireless network, because Node=Device moves within a broad area, the connection point to the network changes frequently. It also sometimes seems as if the terminal itself has disappeared due to a shutdown or going out of radio range.

An object of the present invention is to provide a protocol making possible correct routing control in a network with such severe topology changes and a radio terminal telecommunications method.

SUMMARY OF THE INVENTION

The present invention is a method for performing multi-hop peer-to-peer telecommunications on a wireless network, which includes a plurality of radio terminals, and topology of which changes moment by moment and, comprising the steps in which:

each radio terminal exchanges the link state with radio terminals capable of direct communications (the link state including only information on radio terminals within a predetermined number of hops), and constructs a routing table;

a packet is prepared including a routing stack for storing intermediate routing information therefor whenever the packet passes through the terminals;

a sender terminal designates a destination terminal to broadcast the packet;

the radio terminals on the route, which receive the packet, write the intermediate routing information to the routing stack while transferring the packet to all radio terminals based on the routing table;

the destination terminal which receives said packet returns said packet to said sender terminal through the route followed by said packet based on information in said routing stack; and said sender terminal which receives said packet unicasts a message to said destination terminal through the radio terminals on said route based on information in said routing stack included in said packet.

The present invention is a telecommunications method for radio terminals, constituting a wireless network, and comprising:

a routing table generating step, wherein the link state is exchanged with radio terminals capable of direct communication (this link state includes only information on radio terminals within a predetermined number of hops), and a routing table is constructed;

a transferring step for transferring the received packet, when this packet is not addressed to itself, to a prescribed terminal based on the intermediate routing information in the routing stack included in the packet and the contents of the routing table;

a source routing demand packet transfer step for writing the intermediate routing information to the routing stack included in the packet when the received packet is a source routing demand packet and is broadcast, while transferring the packet to all radio terminals based on the routing table; and a source routing demand packet return step for transferring the packet to the prescribed terminal based on the intermediate routing information in the routing stack included in the packet, and the contents of the routing table, when the received packet is a source routing demand packet and undergoes sendback unicast from the terminal to the sender terminal.

A program relating to the present invention causes a processor to execute the aforementioned method. The program relating to the present invention is recorded on a recording medium, for example.

The medium includes, for example, an EPROM device, flash memory device, flexible desk, hard disk, magnetic tape, magneto-optical disk, CD (including CD-ROM, video CD), DVD (including DVD-Video, DVD-ROM, DVD-RAM), ROM cartridge, RAM memory cartridge with battery backup, flash memory cartridge, non-volatile RAM cartridge, or the like.

The medium also includes telecommunications media such as a wired telecommunications medium like a telephone circuit, or a wireless telecommunications medium like a microwave circuit. The Internet is also included in such telecommunications media.

A medium is a device to which information (mainly digital data and programs) is recorded by some physical means and can also cause a processing device such as a computer or dedicated processor to carry out prescribed functions. In short, the medium may be a device which downloads a program to a computer by some means and causes the execution of prescribed functions.

BRIEF DESCRIPTION OF THE DRAWINGS

FIG. 9 shows a flowchart of the destination terminal processing in an embodiment of the present invention;

FIG. 10 shows a flowchart of the processing of mid-route terminals in an embodiment of the present invention; and FIG. 11 shows a flowchart of the stack reconstruction processing in an embodiment of the present invention.

DESCRIPTION OF THE PREFERRED EMBODIMENTS

Following is a detailed explanation of a routing protocol relating to the present invention (hereinafter referred to as "Jnutella routing protocol") using the example of the network topology in FIG. 1. In this drawing, the circles 1 containing letters indicate each terminal. The solid lines between the plurality of terminals 1 show sessions between the terminals 1. A terminal 1 is a mobile terminal such as a portable telephone, portable information terminal, or notebook personal computer. A terminal 1 can conduct communications with other terminals 1 within a prescribed covered area. A terminal 1 can communicate through the network with a terminal 1 outside of the covered area. For example, in FIG. 1, even though the terminal 1F is outside the covered area of the terminal 1A and cannot communicate directly, the terminal 1A can communicate with the terminal 1F through terminals 1B, 1D, and 1E. Each terminal 1 has the routing table of FIG. 2.

Figures 1, 2:
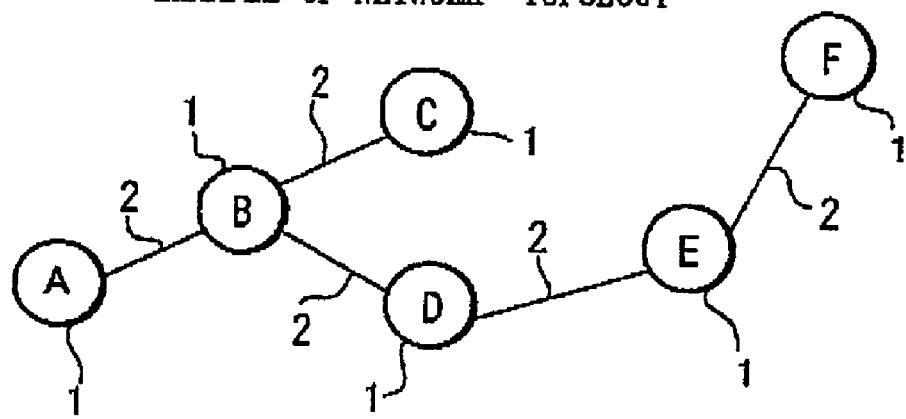
FIG. 1 shows an example of network topology to explain the routing protocol relating to an embodiment of the present invention.
FIG. 2 shows an example of a routing table relating to an embodiment of the present invention.
Figure 3:
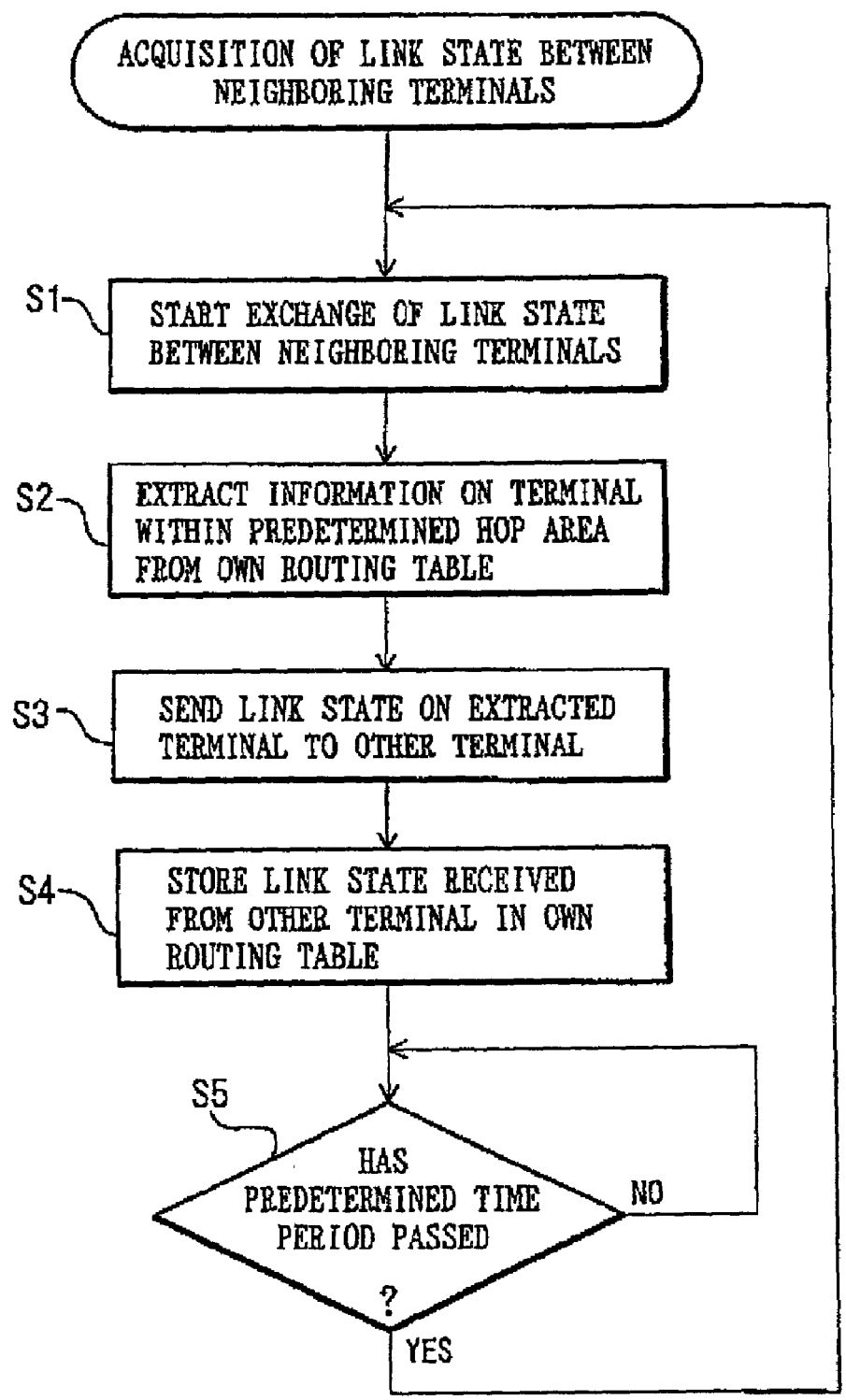
FIG. 3 shows a flowchart of the link state acquisition processing between neighboring terminals in an embodiment of the present invention.

The Jnutella routing protocol employs a proactive model wherein a link state having the structure in FIG. 2 is periodically exchanged between neighboring terminals 1, and a routing table is constructed in advance regardless of the data communications timing. FIG. 3 is a flowchart showing this processing in a terminal 1.

FIG. 3 S1: Processing for exchanging link information between neighboring terminals at a prescribed time will be explained. This process comprises Steps S2 through S5 in FIG. 3. This process is explained specifically with reference to FIGS. 4 and 5 below.

Figure 4:
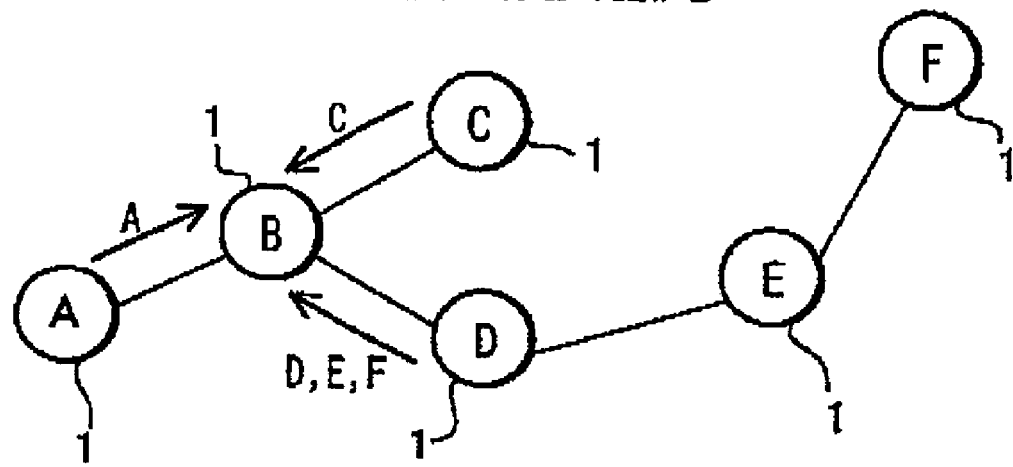
FIG. 4 shows the topology in FIG. 1 as seen from terminal 1B.

FIG. 4 shows a situation in which the terminal 1B acquires the link state from neighboring terminals 1A, 1C, and 1D. Here, the terminals 1A, 1C, and 1D are all within the covered area of the terminal 1B and the terminal 1B can communicate directly with each of the terminals 1A, 1C, and 1D. The terminal 1B receives the link state of terminal 1A from the terminal 1A itself and the link state of terminal 1C from the terminal 1C itself, while receiving the information of the terminal 1D, as well as of terminals 1E and 1F, from the terminal 1D itself. For this reason, the terminal 1B can be informed of the existence of 1E and 1F (the terminal 1B cannot communicate directly with these terminals) which are beyond the terminal 1D.

FIG. 3 S2: The process for extracting the information on terminals within the predetermined hop area from a terminal's own routing table will be explained.

In this protocol, each terminal 1 does not exchange all the link information known by itself at once, but causes the refresh rate to vary according to the scope (number of hops to partner) of the terminal. This is because it is highly probable that the link information on a terminal at scope more distant than necessary becomes invalid by the time of its relay transmission to the other party according to the procedures in FIG. 3 due to the extreme routing changes in the mobile environment.

Figure 5:
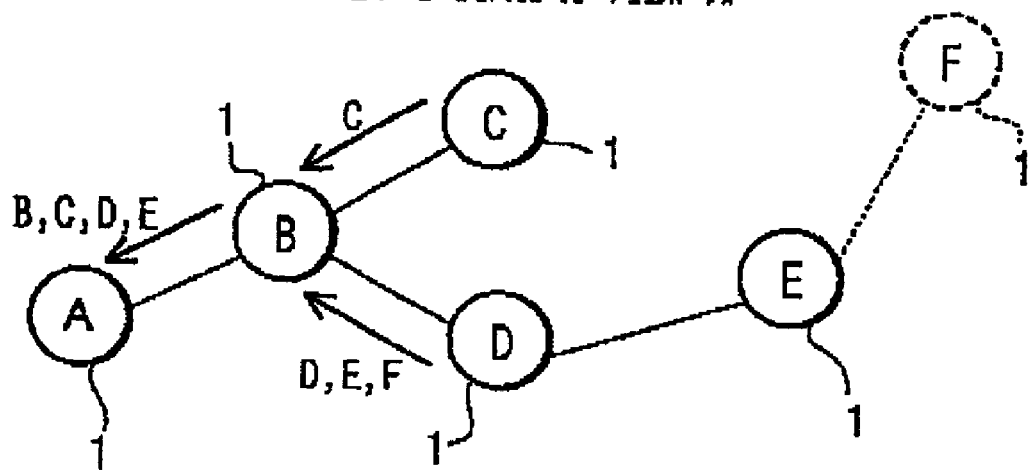
FIG. 5 shows the topology in FIG. 1 as seen from terminal 1A.

In this protocol, the refresh rate is caused to change per three hops, for example. FIG. 5 shows an example of this case. In FIG. 4, the terminal 1B possesses the link state of terminals 1A, 1C, and 1D through 1F. In the case in FIG. 5 where the terminal 1A attains the link state from the terminal 1B, terminals at over three hops as seen from the terminal 1A (the receiving side), specifically the terminal 1F (4 hops from terminal 1A to terminal 1F), are deleted from the link information transferred by the terminal 1B. The terminal 1F is not registered in the routing table within a three hop range as seen from the terminal 1A. In effect, the terminal 1F cannot be seen from the terminal 1A. This method makes it possible for a terminal to stabilize and acquire the route information within the number of hops important for itself, while suppressing the telecommunications band periodically used in order to exchange link information.

The procedures for carrying out peer-to-peer telecommunications according to an embodiment of the present invention will be explained next with reference to FIGS. 6 through 11.

Figures 6, 7:
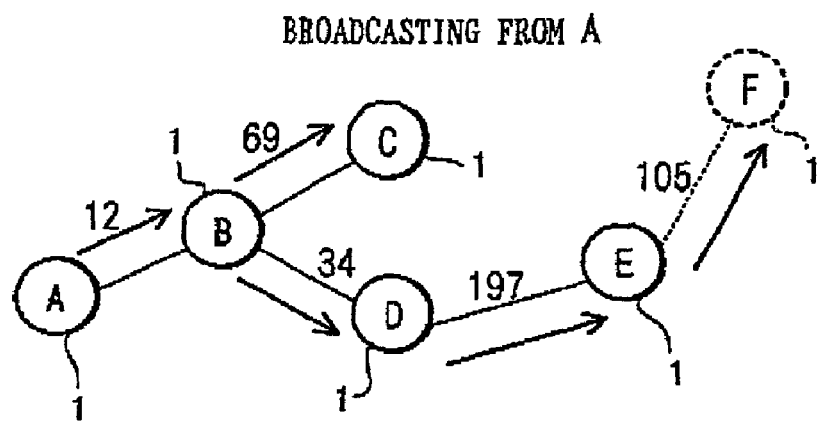
FIG. 6 shows the state of broadcasting from terminal 1A in FIG. 1.
FIG. 7 shows the state of the routing stack in the case of FIG. 6.

As discussed above, each terminal 1 possesses only the link state on terminals within a predetermined number of hops (=3) and does not have link information for terminals outside the hop range. As a result, the terminals 1A and 1F in FIG. 1 can only use broadcasting to exchange packets. This is inefficient compared to the shortness of the number of hops. If the number of hops is increased (to the number of hops=4 in FIG. 1), this problem can be resolved. However, it becomes necessary to increase the refresh rate in order to fill in the time difference of the number of hops for transmitting when the scope of link state exchange is expanded. Also, the telecommunications band is consumed unnecessarily. For this reason, in the embodiment of the present invention, the scope of link state exchange is kept narrow, but also doubles as an on-demand type source routing which uses the packet construction. FIG. 7 shows an example of the route stack table for realizing this routing and FIGS. 8 through 11 show flowcharts of the processing in each terminal.

In the following explanation, "broadcast" indicates the multi-hop transfer of a received message to all connected nodes. "Unicast" indicates the multi-hop transfer of a received message to specific connected nodes. "Sendback unicast" indicates the return of a received message to the sender along the route it traveled.

If the scope of link state exchange is S and the depth of the route stack is D, S+D is the communications radius of the theoretical unicast in the embodiment of the invention (for example, S=3 or 5, D=7).

In the protocol relating to this embodiment of the invention, the intermediate route information whenever the packet passes through a terminal is stored within the packet (See S35 through S38 in FIG. 10). This is called the route stack. Also, the package has a stack pointer for showing the location of the value which should be acquired next from the route stack. The data sender terminal broadcasts the packet (See S10, S11 FIG. 8), whereby the return route to the sender is embedded in the route stack of that packet at the time it arrives at the destination terminal.

Moreover, in the case where it is known in advance that the destination terminal is present in the routing table (FIG.

8, S10*a*, YES), the packet is unicast to the destination terminal based on the routing table, instead of being broadcast in S11 (S10*b*).

Specifically, upon broadcasting from the terminal 1A in FIG. 6, the interior of the routing stack becomes as shown in FIG. 7 at the time when the packet arrives at the terminal 1F. Values layered in the stack are the terminal's local link ID or Identity. The link ID or Identity may be uniform between neighboring terminals, but does not need to be globally uniform. Also, the zero is reserved in advance for the link ID or Identity indicating that the stack is empty.

In this embodiment of the present invention, an addressing system such as IP is not employed. There is instead the concept of "Identity" (link ID). The important function of Identity is "the abstraction of node identity". In the protocol of this embodiment of the present invention, if the Identity.equals( ) method (terminal identification method) returns FALSE, that node is determined to be another individual. Message transmission and reception in this embodiment of the present invention is sent to all of these Identities.

When the terminal 1F returns a packet (sendback unicast), the terminals (for example, terminal 1E) on the route move the stack pointer, and at the same time retrieve the link ID or Identity, and transfer the packet to the neighboring terminal corresponding to that value (See S39, S40, S42 in FIG. 10). It becomes possible to return data to the sender when each terminal 1 on the route carries out this process. The transfer speed is high since this process does not require searching of the routing table.

Figure 8:
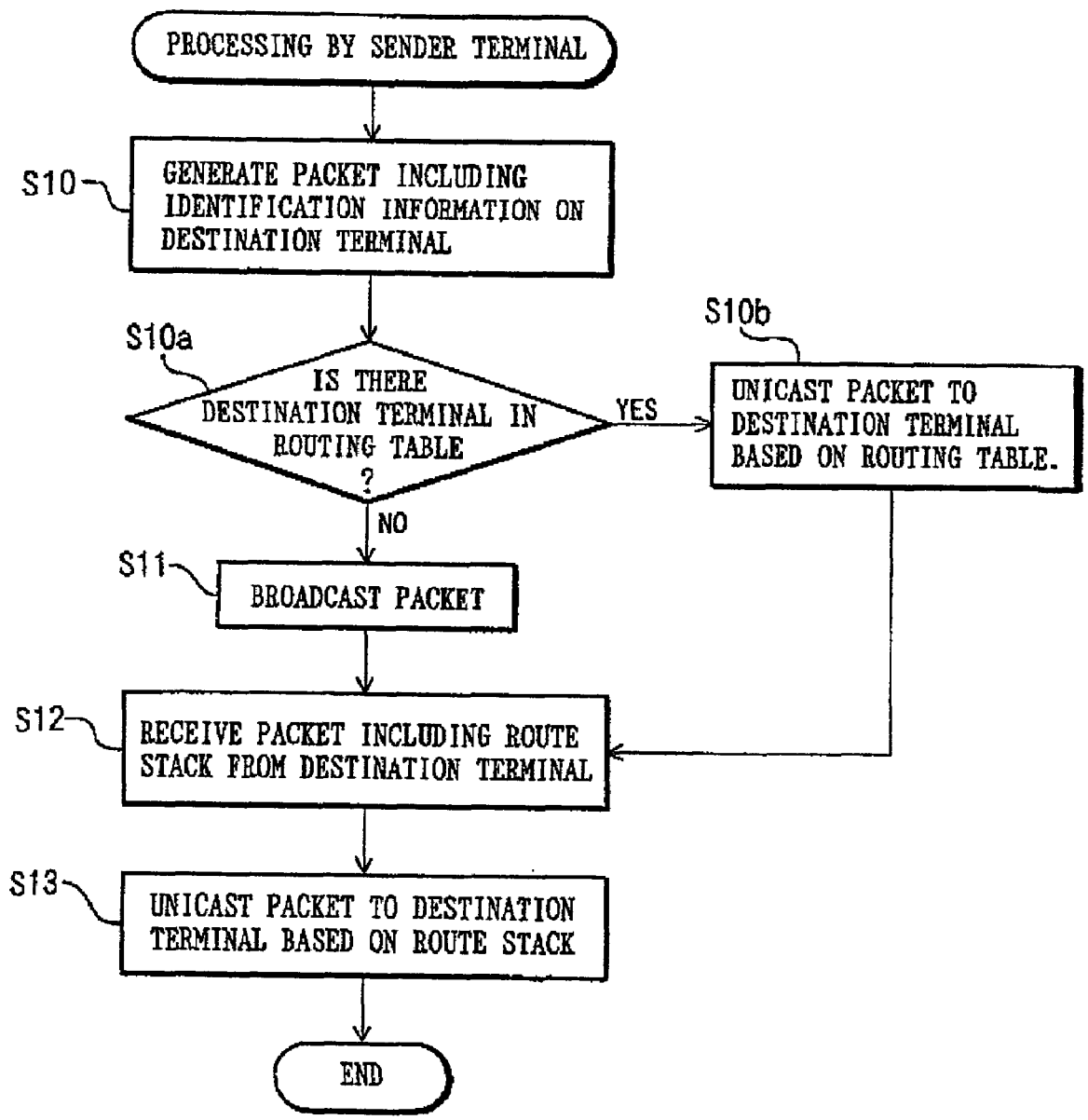
FIG. 8 shows a flowchart of the sender terminal processing in an embodiment of the present invention.

Terminal 1A can send packets to the destination terminal based on the routing stack of the returned packet (S12, S13 in FIG. 8).

Consider a case wherein the link between the terminal 1D and the terminal 1E is cut and instead a new link is formed between the terminal 1C and the terminal 1E. At the time when a packet is returned from the terminal 1F to the terminal 1E, it becomes necessary to reconstruct the stack because the transfer point corresponding to the link 1D of the next hop or Identity is lost (YES in S42 FIG. 10).

FIG. 11 shows an example of the stack reconstruction process. When it is determined that the value is invalid, the stack is completely cleared (S50), and broadcasting is again constructed from the terminal 1E toward the terminal 1A (S51, S52). The terminal 1A receives this packet and sends the packet to the destination terminal 1F.

The protocol in this embodiment of the present invention operates in a network environment wherein the topology can change easily, such as a wireless network, and designates an application level P2P Protocol. This has the following characteristics.

(1) Ad Hoc Network

In a wireless network, the connection point to the network is frequently switched because Node=Device moves over a broad area. It may also seem as if the terminal itself disappears due to shutdowns and going out of radio range. It can therefore be said that:

a static node table covering the entire network area does not exist;

the network position of a node cannot be estimated from the individual information of the terminal such as the device ID; and it is possible that a route that was valid at one moment may be entirely lost the next.

The protocol of this embodiment of the present invention can operate without failure under these conditions.

(2) Fully Decentralized

A central server or central point used in other protocols/systems is not a key part of the architecture. On a wireless network such as the Internet where Reachability cannot be presupposed, it may not be possible to discover a central point ("server" in conventional terminology) even if the server is present. A central point is a peripheral element introduced "arbitrarily", such by a company ensuring traffic quality for users.

What is claimed is:

1. A method for performing multi-hop peer-to-peer telecommunications on a wireless network, which includes a plurality of radio terminals that can conduct mutual communication within a prescribed covered area, and topology of which can change moment by moment, comprising the steps in which:

each radio terminal exchanges a link state with other radio terminals within said prescribed covered area, and constructs a routing table based on the exchanged link state;

a source routing demand packet is prepared including a routing stack for storing intermediate routing information therefor whenever said source routing demand packet passes through the terminals;

a sender terminal includes identification information on a destination terminal in said source routing demand packet and broadcasts said source routing demand packet;

the radio terminals on a route of said source routing demand packet write the intermediate routing information to said routing stack while multicasting said source routing demand packet to all radio terminals within said prescribed covered area based on said routing table;

the destination terminal which receives said source routing demand packet unicasts said source routing demand packet to said sender terminal through the route followed by said source routing demand packet based on information in said routing stack included in said source routing demand packet; and said sender terminal, which receives said source routing demand packet unicasted by said destination terminal, unicasts a message to said destination terminal through the radio terminals on said route followed by said source routing demand packet based on information in said routing stack included in said source routing demand packet.

2. The method for performing multi-hop peer-to-peer telecommunications according to claim 1, wherein said intermediate routing information includes the link ID and/or Identity showing the route; and said link ID and/or Identity is uniform among terminals which can communicate directly, but is not globally uniform.

3. The method for performing multi-hop peer-to-peer telecommunications according to claim 2 wherein a specific number and/or symbol is reserved as said link ID and/or Identity showing that said routing stack is empty.

4. The method for performing multi-hop peer-to-peer telecommunications according to claim 1, wherein said destination terminal and/or said radio terminal in the route discovers that the link with the transfer partner included in said routing stack is cut in the route wherein said packet is returned to said sender terminal, at which time said destination terminal and/or said radio terminal reconstructs said routing stack.

5. A telecommunications method for a wireless network including radio terminals that can conduct mutual communication within a prescribed covered area, and comprising:

a routing table generating step, wherein each radio terminal exchanges a link state with other radio terminals within said prescribed covered area, and constructs a routing table based on the exchanged link state;

a transfer step wherein a packet is transferred from a first radio terminal to another radio terminal based on said routing table if said packet is not addressed to said first radio terminal;

a source routing demand packet transfer step wherein, when said packet is a source routing demand packet, intermediate routing information is written to a routing stack included in said source routing demand packet and said source routing demand packet is multicast to all radio terminals within said prescribed covered area based on said routing table; and a source routing demand packet return step wherein, when said packet is a source routing demand packet and undergoes sendback unicast from a destination terminal to a sender terminal, said source routing demand packet is transferred to a prescribed terminal based on the intermediate routing information in said routing stack included in said source routing demand packet and said routing table.

6. The telecommunications method for radio terminals according to claim 5, wherein said routing table generating step comprises the steps of:

extracting information on the terminals within the predetermined hop range from a terminal's own routing table;

sending the extracted link state relating to the terminal to the partner terminal;

storing the link state received from said partner terminal to the terminal's own routing table; and repeating the above steps after the passage of a prescribed period of time.

7. The telecommunications method for radio terminals according to claim 5, wherein said source routing demand packet transfer, step comprises the steps of:

storing route information within said packet;

storing the local link ID and/or Identity of a terminal in said routing stack;

moving the pointer of said routing stack; and sending said packet to each terminal that is capable of direct communications.

8. The telecommunications method for radio terminals according to claim 5, wherein said source routing demand packet transfer step comprises a step for stopping the transfer process when said routing stack is full.

9. The telecommunications method for radio terminals according to claim 5, wherein said source routing demand packet return step comprises the steps of:

putting back the pointer of said routing stack;

retrieving the link ID and/or Identity from said routing stack; and sending the packet to one terminal based on said link ID and/or Identity.

10. The telecommunications method for radio terminals according to claim 5, wherein said source routing demand packet return step includes a routing stack reconstruction step for reconstructing said routing stack when it is found that the link with the transfer party included in said routing stack has been cut.

11. The telecommunications method for radio terminals according to claim 10, wherein said routing stack reconstruction step comprises the steps of:

completely emptying said routing stack;

obtaining identification information on the sender terminal from said packet to create a packet including this; and broadcasting the created packet.

12. The telecommunications method for radio terminals according to claim 5, further comprising the steps of:

generating a packet including identification information on the destination terminal;

broadcasting the created packet;

receiving a packet including said routing stack from said destination terminal; and unicasting a packet to the destination terminal based on said routing stack.

13. The telecommunications method for radio terminals according to claim 5, further comprising the steps of:

determining whether the received packet is a demand for source routing when said packet is addressed to the terminal itself; and unicasting said packet to the sender terminal based on said routing stack when said packet is a demand for source routing.

14. A medium for recording a program for causing a processor to carry out a telecommunications method for radio terminals that can conduct mutual communication within a prescribed covered area, wherein the program recorded in the medium causes the execution of said program at each respective radio terminal, said method comprising:

a routing table generating step, wherein each radio terminal exchanges a link state with other radio terminals within said prescribed covered area, and constructs a routing table based on the exchanged link state;

a transfer step wherein a first radio terminal in which the program is executed transfers a packet to another radio terminal based on said routing table if said packet is not addressed to said first radio terminal in which the program is executed;

a source routing demand packet transfer step wherein, when said received packet is a source routing demand packet, intermediate routing information is written to a routing stack included in said source routing demand packet, and said source routing demand packet is multicast to all radio terminals in the prescribed covered area based on said routing table; and a source routing demand packet return step wherein, when said packet is a source routing demand packet and undergoes sendback unicast from a destination terminal to a sender terminal, said source routing demand packet is transferred to a prescribed terminal based on the intermediate routing information in said routing stack included in said source routing demand packet and said routing table.

* * * * *